United States Patent [19]

Martinez

[11] Patent Number: 4,664,025
[45] Date of Patent: May 12, 1987

[54] TORTILLA MAKER

[76] Inventor: Marvin G. Martinez, 6017-28th Ave., NW., Gig Harbor, Wash. 98335

[21] Appl. No.: 891,244

[22] Filed: Jul. 29, 1986

Related U.S. Application Data

[63] Continuation of Ser. No. 662,730, Oct. 19, 1984, abandoned.

[51] Int. Cl.⁴ .............................................. A47J 37/00
[52] U.S. Cl. ........................................ 99/331; 99/349;
99/353; 99/377; 99/423; 99/427; 100/93 P;
100/292
[58] Field of Search ............ 426/523; 100/93 P, 233,
100/292, 293; 99/331, 332, 339, 349, 352, 353,
380, 381, 382, 383, 384, 379, 372, 377, 424, 427,
428, 450

[56] References Cited

U.S. PATENT DOCUMENTS

| | | | |
|---|---|---|---|
| 3,299,802 | 1/1967 | Black | 100/292 X |
| 3,587,446 | 6/1971 | Gardner | 99/349 X |
| 3,610,885 | 10/1971 | Zingg | 99/339 X |
| 3,762,321 | 10/1973 | Patros | 100/233 X |
| 3,880,064 | 4/1975 | Martinez | 99/349 |
| 4,184,421 | 1/1980 | Ahlgren | 99/450 |
| 4,483,239 | 11/1984 | Mueller | 99/349 |
| 4,487,116 | 12/1984 | Routhier | 99/339 |

Primary Examiner—Billy J. Wilhite
Attorney, Agent, or Firm—Graybeal, Jensen & Puntigam

[57]  ABSTRACT

A tortilla maker includes a frame which comprises a base (10), and two vertical spine members (32,34) which are secured to the rear edge of the base (10) and extend upwardly therefrom. A lower tortilla-making element (42) is rotatably connected to the two spine members (32, 34). An intermediate tortilla-making element (86) is also connected to the two spine members (32, 34) and includes a lower surface (89) which is at an angle relative to the upper surface of the lower tortilla-making element (42). A handle (18) is rotatably mounted to the base (10) and is operative to raise the lower element against the lower surface (89) of the intermediate element (86). An upper tortilla-making element (92) is positioned on top of the intermediate element (86), upon which tortillas which have been formed and precooked may be placed, if necessary, for completion of cooking.

9 Claims, 5 Drawing Figures

TORTILLA MAKER

This is a continuation of application Ser. No. 662,730, filed on Oct. 19, 1984, now abandoned.

DESCRIPTION

1. Technical Field

This invention relates generally to the art of tortilla-making apparatus, and more particularly concerns a substantially automatic tortilla maker which is primarily intended for home use.

2. Background Art

Traditionally, tortillas, which typically are made from either cornmeal or flour, were in the past made by hand, using rollers. Making tortillas by hand, however, requires a certain amount of skill, and further requires considerable time to make large quantities of tortillas. The increasing demand for tortillas resulted in the development of machines for mass-producing tortillas, which are now sold in large quantities to food stores and to some restaurants. In certain instances, restaurants use tortillas which are made on the premises, either by hand or machine.

The tortillas purchased in retail stores are usually inferior in quality to freshly made tortillas. Most consumers, however, are not willing to make tortillas by hand to achieve the desired result of fresh tortillas. Hence, there has developed a need, especially as the popularity of Mexican food continues to increase throughout the United States and in other parts of the world, for a simple but substantially automatic machine which can be conveniently and reliably used by the home consumer to make tortillas.

Such tortilla making machines are known, as evidenced by Mexican Pat. No. 145,773, to Davilla, and U.S. Pat. No. 3,880,064 to Martinez. The tortilla makers described in those patents, however, are rather bulky and somewhat cumbersome to use. They require too much counterspace and too many separate movements. The quality of the tortillas produced by such machines is also questionable and unpredictable. It is difficult to control the size, thickness and texture of the tortillas with such machines. Further, neither of the above devices is capable of controlling the moisture content of the finished tortillas and neither has the capability of providing follow-on completion of the cooking of the tortilla after it has been formed and partially cooked.

DISCLOSURE OF THE INVENTION

Accordingly, the present invention is a tortilla making machine which includes a lower tortilla making element which has a first heating means therein, an intermediate tortilla making element which is positioned above the lower element and which has a lower surface which is at an angle relative to the lower element, and means for moving the lower element up against the lower surface of the intermediate element, thereby forming and at least partially cooking a tortilla therebetween.

BEST MODE FOR CARRYING OUT THE INVENTION

Figure 1:
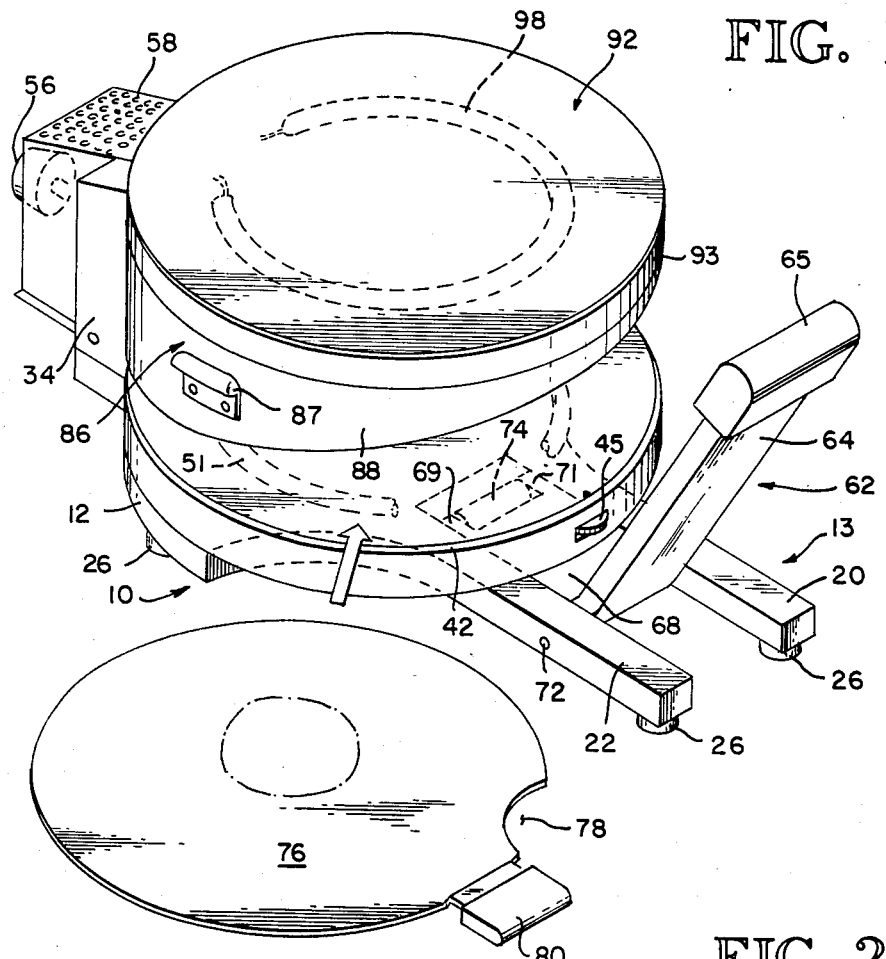
FIG. 1 is an isometric view of the apparatus of the present invention.
Figure 2:
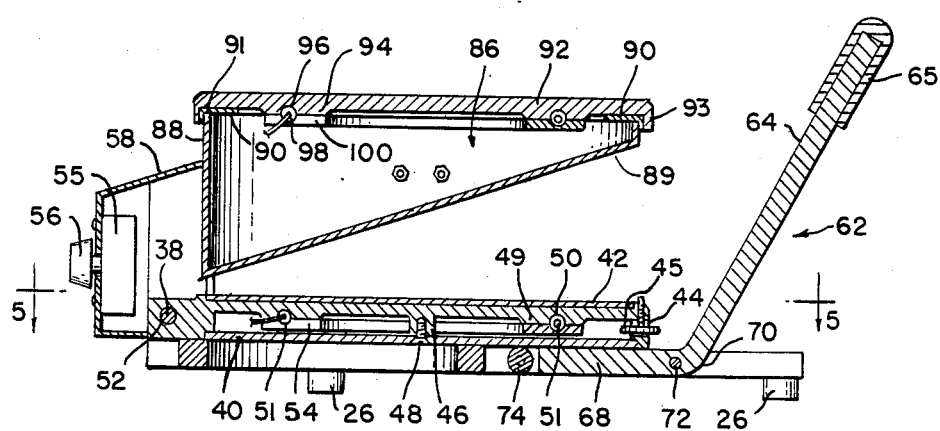
FIG. 2 is a cross-sectional elevational view showing the apparatus of the present invention in a first or lowered position.
Figure 3:
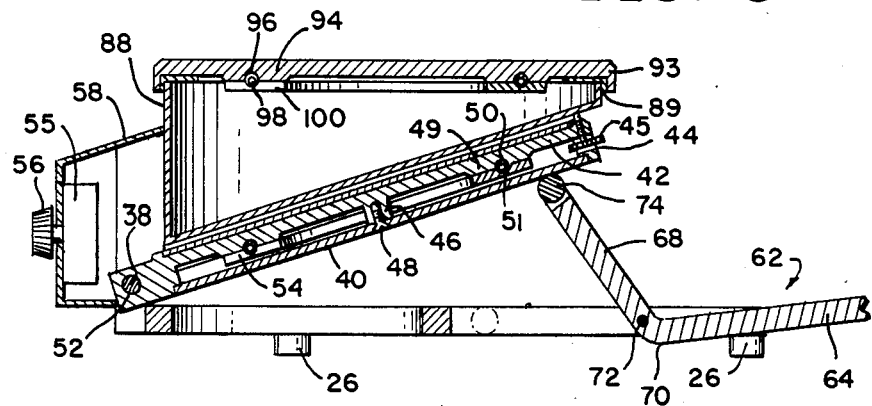
FIG. 3 is a cross-sectional elevational view showing the tortilla maker of the present invention in a second or raised position.
Figure 4:
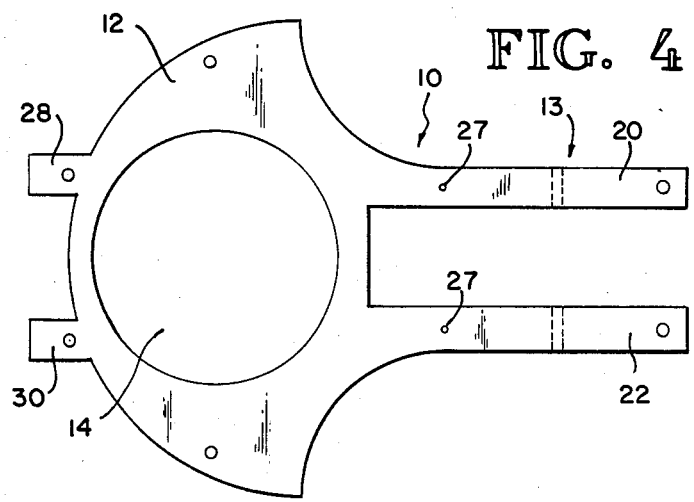
FIG. 4 is a top plan view showing the base plate portion of the apparatus of FIGS. 1-3.
Figure 5:
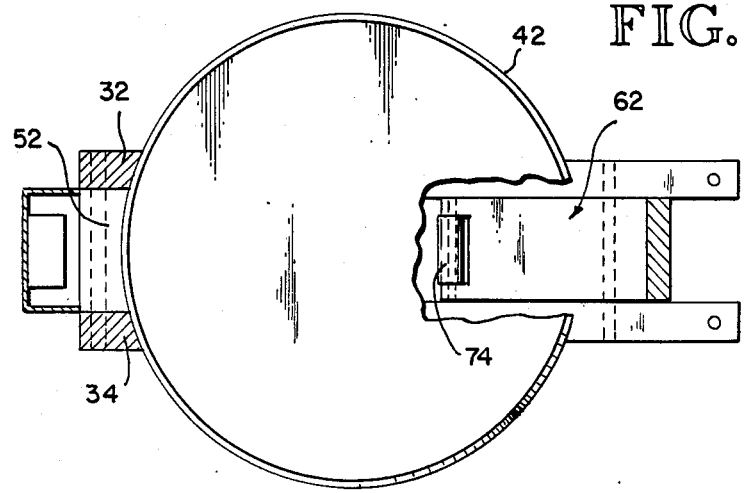
FIG. 5 is a cross-sectional, partially cutaway, view showing the lower portion of the apparatus of FIGS. 1-3.

FIGS. 1-3 show the complete apparatus of the present invention, while FIGS. 4 and 5 show particular portions of the apparatus. FIGS. 1-5 show one embodiment of the present invention and the dimensions provided in this specification are for such an embodiment. It should be understood that other embodiments within the spirit of the invention may have different configurations and/or different dimensions. Referring now to FIGS. 1 and 4, the base plate 10 of the apparatus, which comprises ½ inch aluminum plate, includes a head portion 12 and an extending handle-like portion 13. The head portion 12 is substantially semi-circular in configuration, with a diameter of approximately 9.2 inches. The head portion 12 may include an opening 14.

Handle-like portion 13 is 7.7 inches long and for most of its length is approximately 3.5 inches wide, but curves at the one end which mates with the head portion 12. The straight section of portion 13 is divided into two straight finger elements 20 and 22, which are each approximately 6.25 inches long, approximately 0.76 inches wide and separated by approximately 2.06 inches.

Alternately, finger elements 20 and 22 could be made several inches shorter and additional finger elements (not shown) could be positioned beside elements 20 and 22 and mounted so as to move longitudinally in relation thereto, so as to make the unit smaller for storage. Near the free ends of the finger elements 20 and 22, as well as on head portion 12, on the respective bottom surfaces thereof, are affixed urethane feet 26, which provide support for base plate 10. Positioned on the upper surface of the base plate 10 on each finger element are standoff pins 27, against which the lower tortilla making element portion rests, which prevents the base plate 10 from becoming overheated.

Extending rearwardly from the edge of head portion 12 are two tabs or ear portions 30, 28. Extending upwardly from these two ears in the embodiment shown are two rear support spines 32 and 34. The support spines are attached to the ear portions by screws. Support spines 32 and 34 are solid blocks of aluminum, slightly over 3 inches high and a rear side 0.75 inches wide. The front side of each spine is curved to conform to the curved outer configuration of the tortilla maker elements disclosed hereafter. One adjacent side of each block thus is 1.36 inches and the opposite adjacent side is 1.07 inches. The two vertical spines 32 and 34 and the base plate 10 form the frame portion of the tortilla maker.

The lower tortilla-making element of the tortilla maker is mounted so as to rotate vertically from a first horizontal position adjacent the base plate 10. The lowermost portion of the lower tortilla-making element is a circular cover element 40 of aluminum 0.16 inches thick with a diameter of 8.77 inches. Cover element 40 has a center hole with a diameter of 0.3 inches.

Positioned over cover element 40 is a lower heated tortilla pan 42. The lower tortilla pan, which comprises aluminum, is circular and has a depending circumferential edge 44 which mates with the circumferential edge of the cover element 40, and a central depending portion 46 which also extends down to the top surface of cover element 40. The remainder of the lower tortilla pan is approximately 0.16 inches thick. The central portion 46 has a tapped hole therein, and a screw 48 affixes the cover element 40 to the lower tortilla pan 42. Between the central portion 46 and the circumferential edge 44 of the lower tortilla pan 42, there is a clearance of approximately 0.28 inches between the lower surface of the lower tortilla pan and the cover element 40, except for a ring-like depending portion 49 which is located approximately mid-way between the central depending portion 46 and the circumferential edge portion 44, which portion 49 houses a first heating element. At the front edge of lower tortilla pan 42 is a thumbscrew 45, the end of which extends above the top surface of pan 42. The thumbscrew can be conveniently adjusted by the user to control the thickness of the tortilla.

Cut into the lower surface of depending portion 49 is a circular groove 50 which is semi-circular in cross-section. Positioned in the groove 50 is the first element 51 which is a tube approximately ¼ inch in diameter. In the embodiment shown, heating element 51 is 60 watts and 120 volts AC, with a temperature of approximately 150 degrees. This could vary reasonably between 100–200 degrees. The wires to the heating element 51 extend out to the rear of the lower tortilla pan 42, between spines 32 and 34. The lower tortilla pan 42 also has a rear extension 52 which is substantially rectangular in shape and which fits between the two rear support spines 32 and 34.

A circular first heating element clamp 54 maintains the heating element 51 in place. Clamp 54 is circular and has a circular groove in the upper surface thereof, the groove being semi-circular in cross-section. The upper surface of clamp 54 mates against the lower surface of portion 49 of the lower tortilla pan 42, with the first heating element 51 being captured within the resulting circular groove formed by the two semi-circular grooves in the clamp and the depending portion 49. The clamp is held to the depending portion 49 by 5 spaced screws.

The two wires from the heating element 51 extend to the rear of the lower tortilla pan and are connected to a thermostat 55 positioned within the control housing 58 at the rear of the apparatus.

The thermostat 55 is conventional and is set by control knob 56. Extending from the thermostat is a conventional 120 VAC cord (not shown) for connecting the apparatus to a wall outlet. A male/female plug unit (not shown) may also be provided in the control housing 58. The control housing 58 is aluminum sheet metal, ventilated with numerous openings, and is secured to the side surfaces of the two rear support spines 32 and 34, respectively, by conventional screws or the like. The control cover 58 extends to the rear of the support spines as shown. The top, bottom and side surfaces of the control housing 58 extend inwardly of the apparatus and terminate in edges which are configured to mate with the exterior edge of the mating portion of the tortilla maker.

The remaining element which is located in the lower part of the tortilla maker is the handle 62. The handle is an elongated element of annealed aluminum, ½ inch thick by 2 inches wide. The handle 62 has a first part 64 which is flat, approximately 7.63 inches long and 2.0 inches wide, with a rubber or plastic heat-resistant grip element 65 at the free end thereof, for engagement by the user. The second part 68 in the embodiment shown extends from the end of the first part at an angle of approximately 110 degrees from the plane of the first part, and is 3.09 inches long and also 2.0 inches wide.

At the point 70 where the first and second parts join, there is an opening through the width of the handle, through which a pivot pin 72 extends. The handle fits between the finger elements 20 and 21 of the base plate 10 and the ends of pivot pin 72 extend into the finger elements 20 and 21 so that handle 62 is rotatable about pin 72. A substantial portion of part 64 may be made removable from the remainder of the handle, if desired, to facilitate convenient storage.

At the free end of the second portion 68 of the handle are two protrusions 69, 71 which extend a short distance from the end of portion 68 at the opposite edges thereof. A roller 74 is rotatably positioned between the two protrusions, the roller being 0.56 inches in diameter. When the tortilla maker is in its lowered position, the second portion 68 of handle 62 fits between the two fingers 20 and 21 of the base 10 and in the same plane thereof. The first portion of the handle extends up at an angle of approximately 110 degrees from the second portion, at the front of the tortilla maker. This angle may vary somewhat, however, preferably within a range of ±5 degrees. The roller 74 abuts against the lower surface of the cover element 40.

In operation, when the tortilla maker is to be moved into its raised position, the first portion of handle 62 is moved downwardly about pivot pin 72, and the second portion 68 rotates upwardly, with the roller 74 pushing the cover element 40 and the lower tortilla pan upwardly about horizontal pivot pin 38 which extends between the two vertical support spines.

A lump of tortilla dough is initially placed on a removable pan 76 which is a circular aluminum disk approximately 0.03 inches thick and 8.50 inches in diameter. The pan 76 has a small cut-out portion 78, preferably in the shape of a half-moon, extending inwardly from the edge thereof in order to facilitate removal of the formed tortilla. The surface of the pan 76 is textured to impart a texture to the tortilla. The removable pan 76 also has a handle 80 of heat resistant material which extends from the circumferential edge thereof to facilitate ease of insertion and removal of the pan by the user relative to the remainder of the tortilla maker. The removable pan 76 is configured to fit in a thin depression in the upper surface of the lower tortilla pan 42.

The next element in the tortilla maker is an intermediate tortilla-making element 86. Intermediate element 86 is also aluminum and is circular in top view, and wedge shaped in elevational view, having a circumferential side wall 88 which extends upwardly from the circumferential edge of the lower surface 89 of element 86, which functions as an intermediate tortilla pan. The lower surface 89 is circular and flat. The circumferential wall 88 terminates in an upper edge 91 which lies in a single plane. At its largest dimension, the circumferential wall 88 is 3.16 inches high, while at the opposite side of the element the wall is 0.37 inches high. The diameter of the intermediate tortilla-making element is 8.83 inches. An intermediate heating element may be positioned in the intermediate tortilla pan 89, if desired.

The angle of the surface 89 relative to the plane of the top edge of circumferential wall 88 is approximately 17 degrees. This angle may also vary, again preferable with the range of ±5 degrees. There are two closely spaced openings in the circumferential wall 88 (near its largest dimension) through which the wires for the upper heating element pass. In addition, there are two openings, spaced 180 degrees apart, near the free edge of the circumferential edge wall 88, midway between the largest and smallest dimensions. Screws are used to attach the intermediate tortilla pan to the upper tortilla pan through these openings.

There are additional openings in the circumferential wall 88 through which screws attach the intermediate tortilla pan to the two vertical support spines 32 and 34. Typically, there are two or more screws for each spine. Thus, in effect, the intermediate tortilla making element 86 is stabilized through direct attachment to the frame of the tortilla maker. The intermediate element 86 is oriented so that the higher portion of circumferential wall 88 is to the rear of the tortilla maker with the intermediate tortilla pan surface 89 extending upwardly at an angle of 17 degrees relative to the lower tortilla pan toward the front of the unit. Handles 87 of heat-resistant material may be attached to opposite sides of circumferential wall 88 to permit the user to conveniently move the apparatus.

Around the free top edge 91 of circumferential wall 88 in the embodiment shown is positioned insulation tape 90. On top of the insulation tape 90 is positioned the upper tortilla pan 92, which is quite similar in general configuration to the lower tortilla pan 42. The upper tortilla pan 92 is circular, with a circumferential edge wall 93 which extends down below the lower surface of the upper tortilla pan a short distance, approximately 0.5 inches, thereby providing a circumferential depending lip for the pan. The free edge of the circumferential wall 93 extends slightly below the upper edge 91 of circumferential wall 88 of the intermediate tortilla making element, with the insulation tape 90 being between the upper edge of the intermediate tortilla making element 86 and the upper tortilla pan.

The upper tortilla pan has a depending circular portion 94 comparable to portion 49 for the lower tortilla pan 42. The depending portion is approximately 0.13 inches thick and is approximately midway between the center of the upper tortilla pan and the edge thereof. The lower surface of portion 94 has a circular groove 96 therein, which is hemispherical in cross-section. Positioned in the groove 96 is an upper heating element 98 which in the embodiment shown is a 200 watt 120 volt AC element, providing 400 degrees of heat. This temperature can be varied between 250 degrees and 450 degrees. The electrical wires from the element extend back through the openings in the wall of the intermediate tortilla making element into the area bounded by the control housing 58 to the thermostat.

The upper heating element 98 is held in place by an upper heater clamp 100, which is circular in configuration, similar to lower heating clamp 54. There is a circular groove in the upper surfce of the clamp 100, mating with groove 96 in the lower surface of portion 94 to encompass heating element 98. Clamp 100 is secured to the upper tortilla pan by screws or the like. The upper tortilla pan preferably is flat, with the circumferential edge being rounded.

In an alternative embodiment, the upper tortilla pan could form the upper surface of intermediate tortilla-making element 86, which simplifies the design somewhat. Further, in another embodiment, the support frame may be modified so that the control housing is secured directly to the circumferential wall 88, with the base element being modified to receive a horizontal support rod upon which the lower tortilla making element is rotatably mounted. Means are provided to selectively fix the intermediate tortilla-making element in place, while permitting selective movement thereof to permit convenient cleaning of intermediate tortilla pan surface 89.

In operation, a lump of tortilla dough of defined amount is placed on the removable pan 76 and the removable pan is positioned on the lower tortilla pan 42. The thermostat has previously been set by the user to an appropriate temperature for the lower heating element and the upper heating element, as well as the intermediate heating element, if desired. This will in effect mean that the surfaces of the lower, the intermediate and the upper tortilla pans are hot, with the lower and intermediate tortilla pans being approximately 150 degrees, and the upper one approximately 400 degrees. It may not always be necessary to use the intermediate heating element, as radiation from the upper tortilla pan may provide intermediate tortilla pan 89 sufficient heat.

Following the placement of the removable pan with the dough thereon on the lower tortilla pan, the handle 62 is rotated downwardly, which results in the lower tortilla pan being rotated upwardly about pivot pin 72 against the hot intermediate tortilla pan. As pressure is applied in this manner, the tortilla dough flattens out into the correct shape and thickness, as controlled by the position of the thumbscrew 45, and precooking of the tortilla occurs by virtue of the heated surface of the lower tortilla pan and the intermediate tortilla pan.

When the handle is released, the lower tortilla pan moves back to its original lowered position. The removable pan 76 is removed from the tortilla maker and the tortilla is then removed from the pan. The tortilla is then placed on top of the upper tortilla pan to complete the cooking of the tortilla. Thus, the tortillas are completely cooked in a two-step process; a first forming and partial or precooking step and a second cooking step, all in one apparatus. The apparatus is easy and convenient to use and clean, and produces consistent, high quality tortillas quickly, and therefore overcomes the problems of the prior art. When the intermediate heating element is in use, leaving the lower tortilla pan in the raised position for a longer time will in most cases complete the cooking of the tortilla. In such cases, the upper tortilla pan may not be necessary.

Although a preferred embodiment of the invention has been disclosed herein for purposes of illustration, it should be understood that various changes, modifications and substitutions may be incorporated in such embodiment without departing from the spirit of the invention as defined by the claims which follow.

I claim:

1. An apparatus for forming a dough wafer from a dough ball and for at least partially cooking the dough wafer, comprising:
    a first member having a substantially flat upper surface which is substantially horizontal when said first member is in a first operating position;
    a second member having a substantially flat lower surface, said second member being positioned above said first member and mounted relative to said first member such that the lower surface of said second member is at an angle relative to the upper surface of said first member when said first member is in its first operating position;

means for heating said first and second members; and means for moving said first member from its first operating position to a second operating position, such that the upper surface of said first member is substantially adjacent the lower surface of said second member, resulting in the forming of the dough wafer therebetween and then the at least partial cooking of the dough wafer.

2. An apparatus of claim 1, including means for mounting said first member such that said first member is rotated about a horizontal axis from its first operating position to its second operating position.

3. An apparatus of claim 2, wherein said moving means includes means for applying pressure upwardly against a lower surface of said first member, said moving means being mounted such that said pressure applying means contacts the lower surface of said first member at an initial point which is approximately at least two-thirds of the distance across the lower surface of said lower member from the axis of rotation thereof when said lower member is in its first operating position, said moving means further being mounted such that said pressure applying means moves from its initial point of contact with the lower surface of said first member to a final contact point near the edge of the lower surface of said first member across from the axis of rotation thereof, as said moving means moves said first member from its first operating position to its second operating position, wherein said pressure applying means is in continuous contact with the lower surface of said first member between the initial and final contact points.

4. An apparatus of claim 3, wherein said pressure applying means is a roller which rotates against the lower surface of said first member between the initial and final contact points as said first member is moved from its first operating position to its second operating position.

5. An apparatus of claim 3, wherein said moving means is rotatable about a horizontal axis which is slightly below the lower surface of said first member when said first member is in its first operating position and just outside the edge of said first member across from the axis of rotation of said first member.

6. An apparatus of claim 5, wherein said moving means includes an elongated handle which includes a first portion which extends from the axis of rotation of said moving means and terminates in a free end at which is mounted a roller, said handle further including a second portion which extends outwardly and upwardly from the axis of rotation of said moving means, so that a downward movement of the second portion of said handle results in an upward movement of the first portion of the handle about the axis of rotation of said moving means, resulting in a pressure contact between the roller and the lower surface of said first member and a resulting movement of said first member from its first operating position to its second operating position, wherein the angle between the first portion of the handle and the lower surface of said first member is always less than 90 degrees.

7. An apparatus of claim 1, including means for controlling the temperature of said heating means.

8. An apparatus of claim 1, including means for controlling the thickness of said dough wafer.

9. An apparatus of claim 1, wherein the angle between the upper surface of said first member and the lower surface of said second member when said first member is in its first operating position is approximately 17 degrees, plus or minus 5 degrees.

* * * * *